(12) United States Patent
Van Doren

(10) Patent No.: US 11,391,032 B1
(45) Date of Patent: Jul. 19, 2022

(54) MODULAR BARRIER PANEL AND CONSTRUCTION SYSTEM

(71) Applicant: David Van Doren, Hays, KS (US)

(72) Inventor: David Van Doren, Hays, KS (US)

( * ) Notice: Subject to any disclaimer, the term of this patent is extended or adjusted under 35 U.S.C. 154(b) by 21 days.

(21) Appl. No.: 16/898,623

(22) Filed: Jun. 11, 2020

Related U.S. Application Data

(62) Division of application No. 15/912,704, filed on Mar. 6, 2018, now Pat. No. 10,683,656.

(Continued)

(51) Int. Cl.
| | |
|---|---|
| *E04B 1/04* | (2006.01) |
| *E04B 2/00* | (2006.01) |
| *E04C 2/52* | (2006.01) |
| *E02D 27/02* | (2006.01) |
| *E02D 27/32* | (2006.01) |
| *E04C 2/06* | (2006.01) |
| *E04C 2/30* | (2006.01) |
| *E04C 2/00* | (2006.01) |

(52) U.S. Cl.
CPC .............. *E04B 1/043* (2013.01); *E02D 27/02* (2013.01); *E02D 27/32* (2013.01); *E04C 2/06* (2013.01); *E04C 2/30* (2013.01); *E04C 2/46* (2013.01); *E04C 2/521* (2013.01); *E04B 2103/02* (2013.01); *E04C 2002/004* (2013.01)

(58) Field of Classification Search
CPC . E02D 27/02; E02D 27/32; E02D 2200/1657; E02D 2250/0023; E04B 1/043; E04B 2103/02; E04C 2/06; E04C 2/30; E04C 2/46; E04C 2/521; E04C 2002/004; E04G 9/05; E04G 11/06; E04H 17/14; E04H 17/16; G01H 1/00; G01V 1/001; H02S 20/20; H04N 7/181

USPC .......................................... 256/1, 19, 24, 73
See application file for complete search history.

(56) References Cited

U.S. PATENT DOCUMENTS

| | | | | |
|---|---|---|---|---|
| 4,328,651 | A | * 5/1982 | Gutierrez | ................ E02D 27/02 |
| | | | | 52/169.9 |
| 4,416,098 | A | * 11/1983 | Goidinger | ................. E04C 2/06 |
| | | | | 52/309.16 |

(Continued)

FOREIGN PATENT DOCUMENTS

| | | | | |
|---|---|---|---|---|
| DE | 202015101002 U1 | * | 5/2015 | ............. E04H 17/14 |
| EP | 2481863 A2 | * | 8/2012 | ............. E04C 2/521 |

*Primary Examiner* — Josh Skroupa
(74) *Attorney, Agent, or Firm* — Avek IP, LLC; Mark C. Young

(57) ABSTRACT

A modular barrier panel and a barrier formed therewith and methods and systems for construction of the panel and barrier. The panel includes an aboveground portion and a base portion. The aboveground portion includes a grid-like configuration having a plurality of vents that are sized to limit passage of a human therethrough but that enable viewing through the panel. The base portion includes a plurality of side-by-side, waffle-shaped sections with openings therethrough. The panels can be cast on-site, cured overnight, and immediately installed in the barrier formation. The panels are installed in a trench and the base portions are encased in concrete; the openings in the base allow the concrete to flow to both sides of the panel. Sensors, including cameras and vibration sensors, may be installed in the base section or in the foundation concrete or on the aboveground portion to detect actions on, over, or under the barrier.

18 Claims, 16 Drawing Sheets

Related U.S. Application Data

(60) Provisional application No. 62/467,578, filed on Mar. 6, 2017.

(56) References Cited

U.S. PATENT DOCUMENTS

| | | | | |
|---|---|---|---|---|
| 4,724,642 A | * | 2/1988 | Hoffman | E02D 27/02 |
| | | | | 52/169.13 |
| 9,074,369 B1 | * | 7/2015 | Al-Failakawi | E04C 2/06 |
| 2013/0214227 A1 | * | 8/2013 | Salisbury | E04H 17/16 |
| | | | | 256/24 |

* cited by examiner

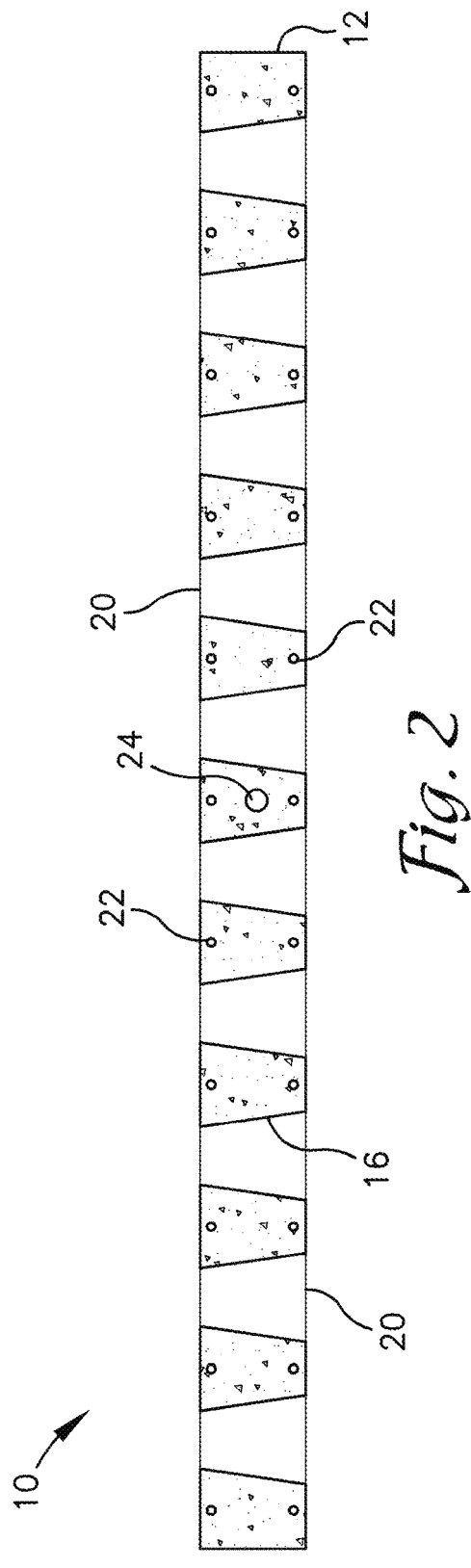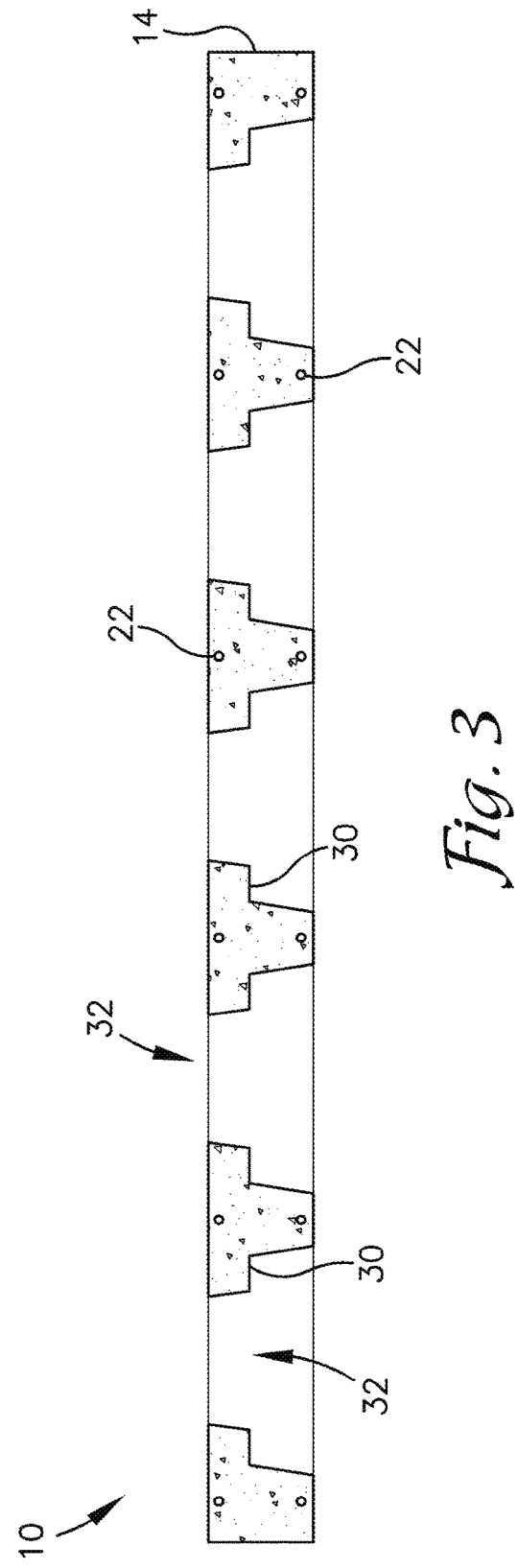

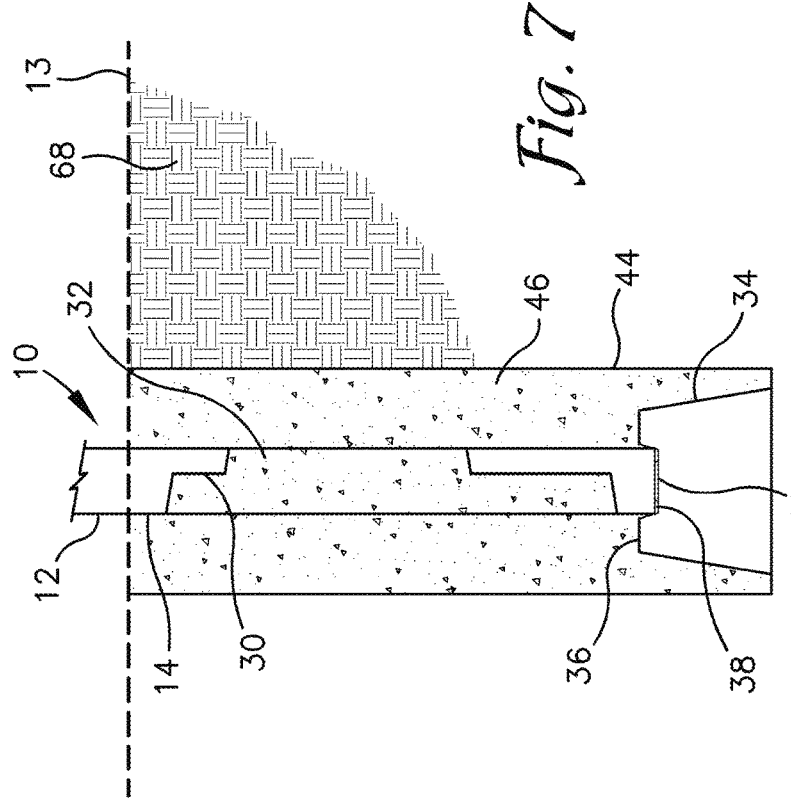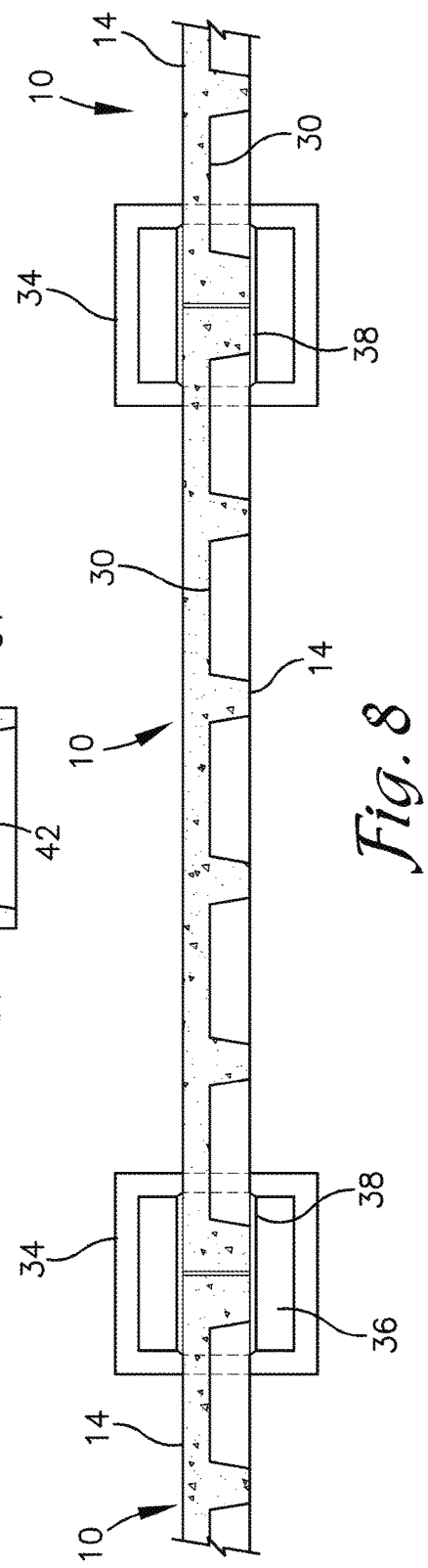

MODULAR BARRIER PANEL AND CONSTRUCTION SYSTEM

CROSS-REFERENCE TO RELATED APPLICATIONS

This application is a divisional application of U.S. patent application Ser. No. 15/912,704 filed Mar. 6, 2018 and claims the benefit of U.S. Provisional Patent Application No. 62/467,578 filed Mar. 6, 2017, the disclosures of each of which are hereby incorporated herein in their entirety by reference.

BACKGROUND

A great deal of interest and discussion has recently been devoted to the construction of walls, fencing, and barriers along boarders between nations as well as other properties and locations. Such barriers are desired to resist passage of unauthorized people and vehicles across those boarders. Known barriers resist such passage not only through the barrier but also over the barrier.

Known barriers typically comprise fencing and steel piers or panels, which may be unsightly and relatively simple to evade or defeat. More substantial barriers like, for example, the Berlin wall and similar structures have been provided as solid concrete walls. While these concrete wall structures are more difficult to pierce, they have a variety of negative aspects. For example, the cost to produce a concrete wall is much more than that to erect fencing and/or steel pier systems. Additionally, concrete walls are generally solid structures that provide little or no ability to see through the barrier. Security professionals on the ground thus cannot view activities occurring on the opposite side of the barrier without requiring additional resources like cameras or mirrors mounted on the barrier.

Such solid structures can also have negative environmental impacts including impeding the flow of winds and water drainage which may affect not only the land but also the nearby habitats of animals and plants. Solid wall structures also obstructing the movement of animals, insects, and plants which can affect their ability to migrate, find food, mate, pollenate, and spread among other aspects.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, modular barrier panels as well as systems and methods for preparing the barrier panels and erecting a barrier.

The modular barrier panels are configured for simple and speedy construction and erection. The panels are preferably cast of a concrete material at or near the building site of the barrier using molds that can be carried on a mobile trailer, such as a flat-bed trailer or truck. Once sufficiently cured, the panels can be removed from the molds and moved directly to the building site for immediate installation or storage.

In one embodiment, each of the panels is configured with an aboveground portion and a below-grade or base portion. The aboveground portion includes a grid-like pattern that provides a plurality of vents having dimensions that are sufficiently small enough to substantially prevent passage of a human therethrough, but large enough to enable viewing through the panel as well as passage of wind, water, small animals, and other environmental aspects. The vents also reduce forces applied to the barrier by winds and reduce the weight and material needs of the panels. The base portion includes a plurality of side-by-side sections that each include a generally centrally located opening extending therethrough.

In another embodiment, the base portion has a configuration that is the same as the aboveground portion such that the grid-like pattern is continuous from top to bottom of the panel. The base portion may extend above grade such that the vent openings of the base portion extend above grade or ground level. In other embodiments, one or more of the vents in a panel are closed off, e.g. the opening of the vent is filled with a planar section of the concrete material during molding of the panel. Generally, the closed off vents are located in transverse rows. In another embodiment, one or more rows of the vents are replaced with a continuous concrete slab.

To erect a barrier using the modular barrier panels, a trenching unit is provided which digs a trench of the proper depth and width. Bearing blocks are installed within the trench and spaced along the length thereof at intervals equal to the width of the barrier panels, such that the bearing block is positioned beneath the abutting faces of adjacent ones of the barrier panels. The barrier panels are installed on the bearing blocks and supported in a vertically upright position while a concrete or similar material is poured in the trench and around the base portion of the barrier panels. The openings in the sections of the base portions allow the concrete material to flow through the panel and fill the trench on both sides of the panel.

Sensors, such as vibration sensors may be disposed along or in the base portions and/or in the concrete material. The sensors may be configured to sense tampering with the aboveground portions of the panel, attempts to scale or climb over the aboveground portion, and attempts to tunnel under the barrier. Cameras, sensors, communication devices, and power generation devices such as solar panels, may be installed on one or more of the barrier panels.

DESCRIPTION OF THE DRAWINGS

Illustrative embodiments are described in detail below with reference to the attached drawing figures, and wherein:

FIG. 2 is a cross-sectional view of the modular barrier panel of FIG. 1 taken along the line 2-2;

FIG. 3 is a cross-sectional view of the modular barrier panel of FIG. 1 taken along the line 3-3;

FIG. 7 is a cross-sectional view taken along the line 7-7 in FIG. 4 of a modular barrier panel disposed on a bearing block and depicted in an installed condition in accordance with an exemplary embodiment;

FIG. 8 is a top plan view taken at a transverse cross-section through the base portion of three modular barrier panels depicting bearing blocks disposed beneath abutting faces of the barrier panels;

DETAILED DESCRIPTION

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about," "approximately," and "substantially" as used herein denote deviations from the exact value by +/−10%, preferably by +/−5% and/or deviations in the form of changes that are insignificant to the function.

Figure 1:
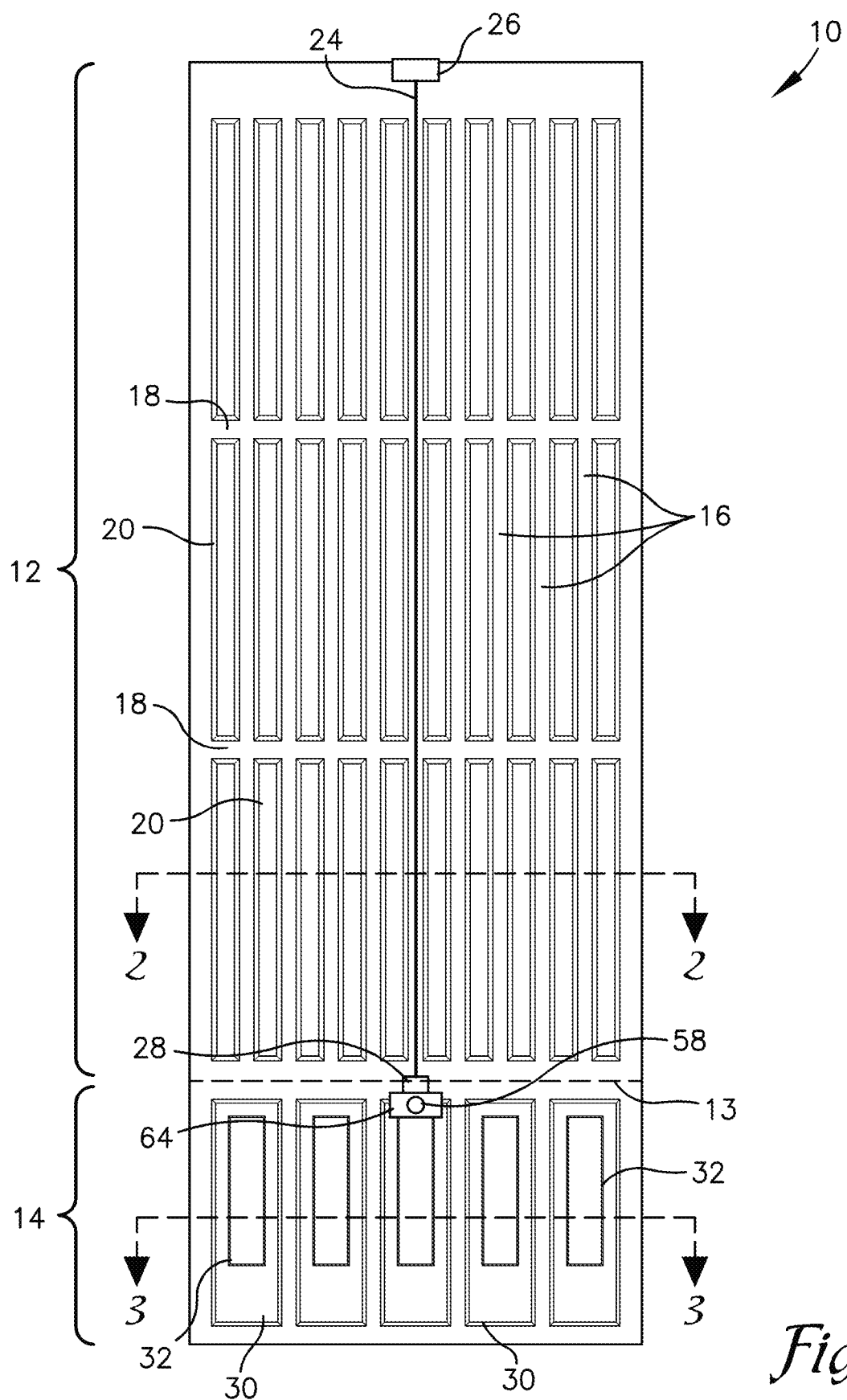
FIG. 1 is an elevational view of a modular barrier panel depicted in accordance with an exemplary embodiment.

With reference to FIGS. 1-3, a modular barrier panel 10 is described in accordance with an exemplary embodiment. The panel 10 is shown and described herein as being configured for use in construction of a barrier or fence useable to divide parcels of land and/or to control travel of people and vehicles between the parcels. The panel 10 is preferably formed from a self-leveling, high-strength, flowable, concrete material, however it is understood that any concrete or other material such as composites, plastics, metals, organic materials, or combinations thereof may be employed and selected based on desired characteristics and properties of a particular application.

Particular dimensions of the panel 10 and associated components are described herein, however such dimensions are not intended to limit configurations of the panels 10 and associated components. It is understood that such dimensions are of only one exemplary embodiment and that the panels 10 and associated components may be otherwise dimensioned without departing from the scope of embodiments described herein. The panel 10 is approximately twelve feet (3.7 meters) wide by about thirty-four feet (10.4 meters) high and about ten inches (0.3 meters) thick. When installed, the panel 10 extends about seven feet (2.1 meters) belowground and about twenty-seven feet (8.2 meters) aboveground. Such dimensions are considered adequate for an application of the panel 10 directed toward preventing passage of humans and vehicles through or over a barrier formed from the panels 10, however the panels 10 may be otherwise sized to fit a desired application and purpose.

The panel 10 comprises a generally rectangular cuboidal form configured to be installed in a generally vertically upstanding orientation. The panel 10 is generally planar in that the height and width of the panel 10 are substantially larger than the thickness of the panel 10. As depicted in FIG. 1, the panel 10 is generally divided along its vertical dimension into an aboveground portion 12 and a below-grade or base portion 14 which are generally delimited by a grade line 13 depicted in FIG. 1. The grade line 13 is provided for reference purposes only as an indication of a preferred installation depth of the panel 10 relative to the substrate, however it is to be understood that characteristics of a particular installation will determine and control construction and placement of the panel 10. The aboveground portion 12 includes a series of vertical members 16 and horizontal members 18 arranged in a grid-like arrangement to form a plurality of apertures or open vents 20 that extend through the thickness of the panel 10.

The open vents 20 are preferably configured with dimensions sufficiently small enough to prevent passage of a human therethrough but large enough to allow environmental elements, such as wind, water, airborne debris, small animals, insects, and the like to pass through. For example, the opening of the vents 20 may be about 5.5 inches (about 14 cm) wide. As depicted in FIG. 1, the panel 10 includes three vertically stacked and aligned rows of uniformly dimensioned vents 20, but a variety of other configurations may be employed without departing from the scope of embodiments described herein. For example, various ones of the vents 20 might be differently sized or one or more of the vents 20 might be offset vertically or horizontally. One or more of the vents may be configured as closed vents 48 in which the vents are molded or otherwise constructed with a portion of concrete or other material extending thereacross.

As depicted in FIG. 2, the vertical members 16 are provided with a generally trapezoidal cross-sectional form. This form provides draft to aid the molding or casting process but may be configured otherwise in other embodiments. The horizontal members 18, as well as any other surfaces of the panel 10 may also be configured with a drafted or angled surface. In one embodiment, a draft of about 45° is provided on the vertical members 16 and the horizontal members 18 which may aid to increase the difficulty of scaling or climbing the panel 10.

Also as depicted in FIG. 2, the panel 10 may include one or more reinforcement members 22, such as a steel rebar that is integrated within the panel 10 during casting. The type and configuration of the reinforcement members 22 may be selected based on a particular application of the panel 10 and the conditions to which it may be exposed. In one embodiment depicted in FIG. 14 steel railroad track rails are employed as reinforcement members 22'. The rails are disposed generally centrally within the thickness of the vertical members 16. The reinforcement members 22, 22' and the vertical members 16 generally may extend substantially the height of the panel 10 or, as depicted in FIG. 1-3, in some embodiments some of the reinforcement members 22, 22' and their associated vertical members 16 terminate at the top of the base portion 14 and do not extend through the base portion 14 to the bottom edge of the panel 10. The rails may be newly manufactured or may be constructed or recycled from used rails that are no longer suitable for rail service. The sizing of the vertical members 16 enables rails of a variety of sizes or gages to be employed without need for alteration of the panel design.

Figure 14:
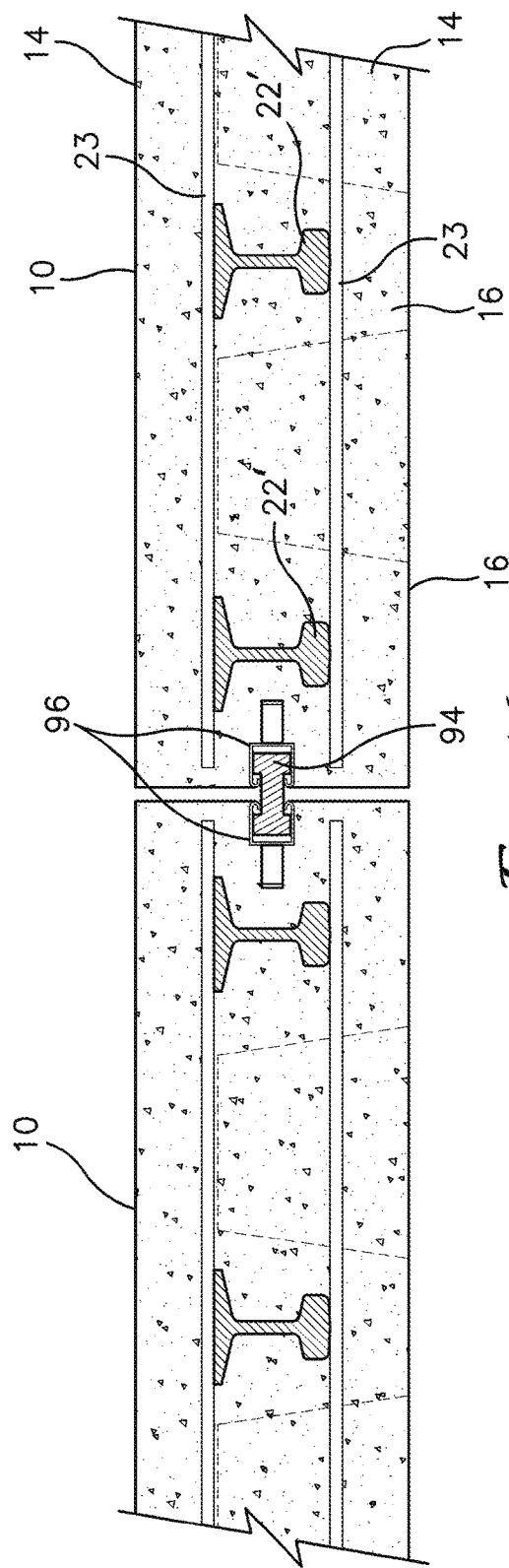
FIG. 14 is a partial cross-sectional plan view taken along the line 14-14 in FIG. 13 near the top of a pair of modular barrier panels depicting a coupling slug disposed in a pair of channels to couple the panels together in accordance with an exemplary embodiment and with underlying vertical reinforcing members depicted in phantom for reference.

Also as shown in FIG. 14, transverse reinforcement members 23 may be incorporated into the panels 10. A pair or reinforcement members 23 comprising steel rebar or similar components may be disposed within the horizontal members 18. The transverse reinforcement members 23 may be spaced just forwardly and just rearwardly of the vertical reinforcement members 22, 22' or may abut or engage the vertical reinforcement members 22, 22'. It is understood that more or fewer transverse reinforcement members 23 may be employed as desired for a particular application.

Additional components may also be integrated into the panel 10, such as conduits, pipes, electrical conductors, anchoring or connecting components, and sensors, among a variety of other components. As shown in FIGS. 1, 2, 9, and 10, a conduit 24 may be integrated into a center-most vertical member 16 and positioned generally centrally within the thickness of the panel 10. In other embodiments, the conduit 24 may be integrated into others of the vertical members 16 and positioned therein as desired, e.g. to avoid obstructing a vertical reinforcement member 22 disposed therein. In one embodiment, the vertical reinforcement member 22 is omitted from the vertical member 16 in which the conduit 24 is disposed. Upper and a lower junction boxes 26, 28 coupled to respective ends of the conduit 24 may also be at least partially integrated into the panel 10. An electrical conductor can be disposed in the conduit 24 to provide electrical communication and power between components mounted at or near the top and bottom of the aboveground portion 12 or the panel 10 as described more fully below.

Figure 11:
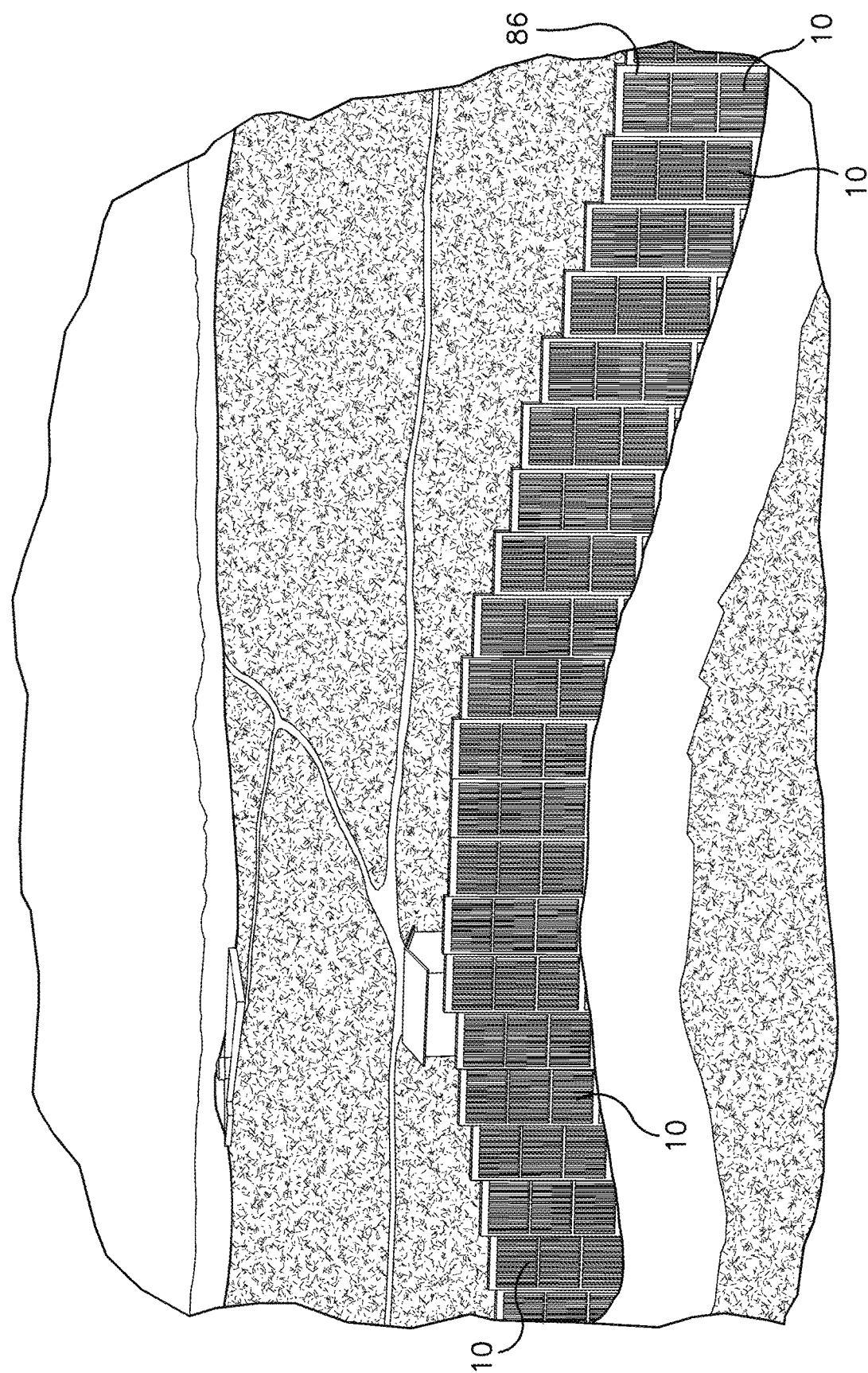
FIG. 11 is perspective view of a barrier formed from a plurality of modular barrier panels in accordance with an exemplary embodiment.

With reference to FIGS. 1, 3-4, and 7-8, the base portion 14 of the panel 10 is provided with a waffle-pattern configuration that includes a plurality of uniform sections or depressions 30 disposed side-by-side across the width of the panel 10. The depressions 30 extend from one surface of the panel 10 part way into the thickness thereof. A window or opening 32 may be provided in each of the depressions 30 which extends through the thickness of the panel 10. The openings 32 are sufficiently large to enable a concrete 46 poured on one side of the base portion 14 to flow through the opening 32 to the opposite side of the base portion 14, as depicted in FIG. 11. It is understood that the base portion 14 may be configured without the openings and/or with the depressions 30 configured in different shapes, dimensions, or arrangements.

Figures 18, 18A:
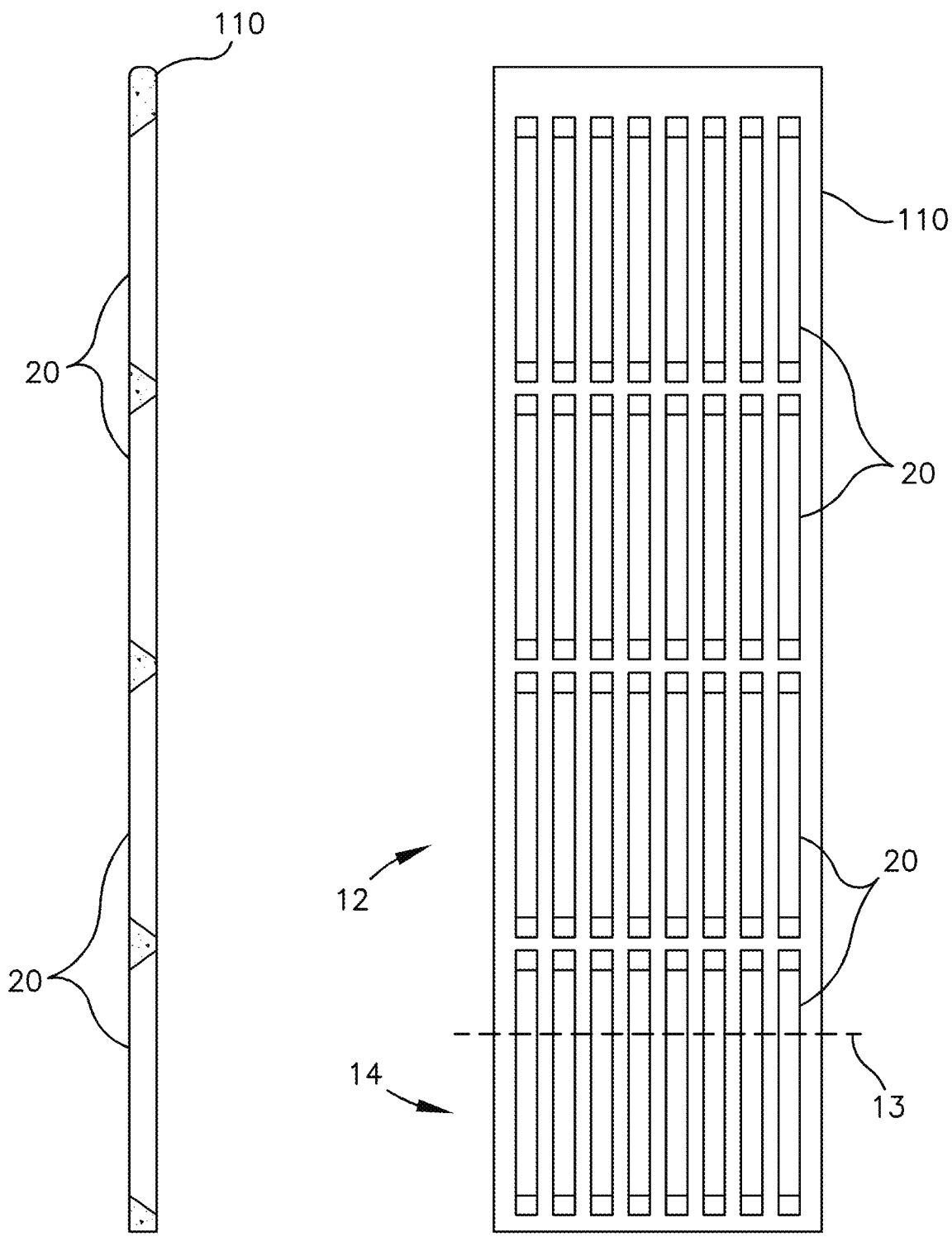
FIG. 18 is a front elevational view of another panel depicted in accordance with another exemplary embodiment.
FIG. 18a is a cross-sectional side elevational view of the panel of FIG. 18.

In some embodiments, the base portion 14 may be configured identically to that of the aboveground portion 12 to continue the grid-like pattern of the aboveground portion 12 with the vertical and horizontal members 16, 18, as depicted in FIGS. 18 and 18a. In such embodiments, the base portion 14 may include the open vents 20 that extend through the thickness of the panel 10 or the vents may be closed vents 48 that are molded with a section of concrete extending thereacross, as depicted in FIGS. 20, 20a, 21, and 21a. The base portion 14 may also be configured to extend at least partially above ground or above grade to expose at least a portion of the vents 20 therein. Exposure of the open vents 20 at ground level may provide ease of access for wildlife to pass through the panel 10 as well as water, wind, and the like.

Figure 4:
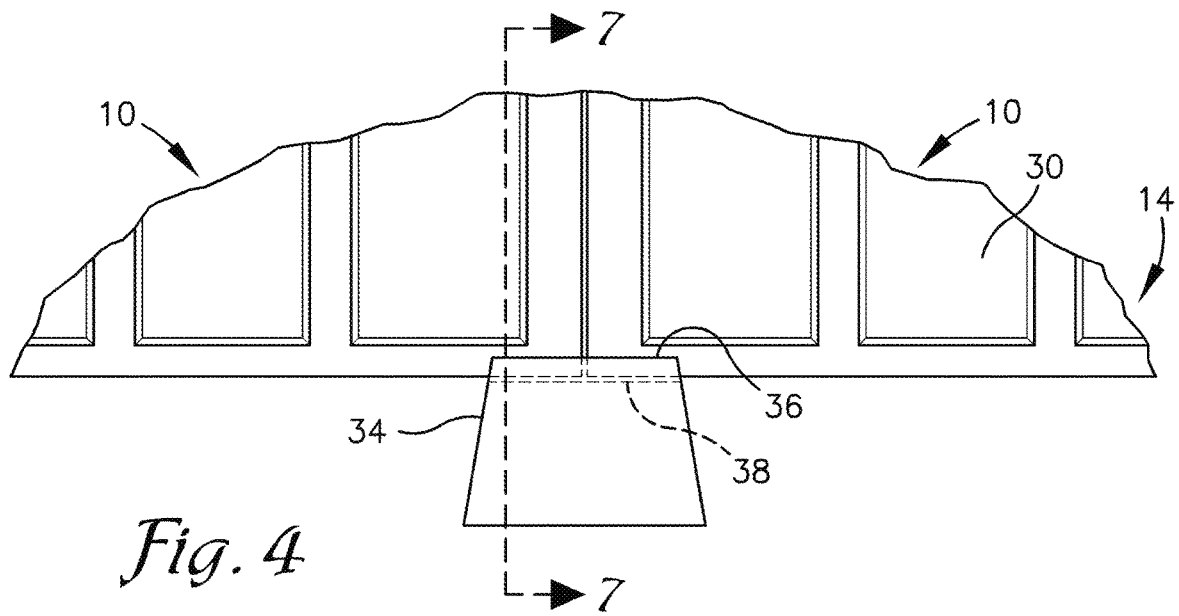
FIG. 4 is an enlarged partial elevational view of a pair of modular barrier panels disposed on a bearing block depicted in accordance with an exemplary embodiment.

With reference now to FIGS. 4-8, bearing blocks 34 may be provided to aid installation of the panels 10. The bearing blocks 34 are preferably cast from the concrete used to cast the panels 10 but may be cast or constructed from another material. The bearing blocks 34 have a generally truncated-pyramidal form that provides a top surface 36 in which a trough 38 is formed. The trough 38 extends the width of the top surface 36 and is dimensioned to receive a bottom edge of the panel 10 therein. The bearing block 34 is preferably sized to be positioned beneath the joint or seam between adjacent panels 10 and to sufficiently support both panels 10. The bearing block 34 is also configured to space the bottom edge of the panel 10 above a bottom surface of a trench 44 when installed therein, as depicted in FIGS. 4 and 7. The spacing above the bottom of the trench 44 is preferably sufficient to enable the concrete 46 poured into the trench 44 to flow beneath the panel 10 as described more fully below.

Figures 5, 6:
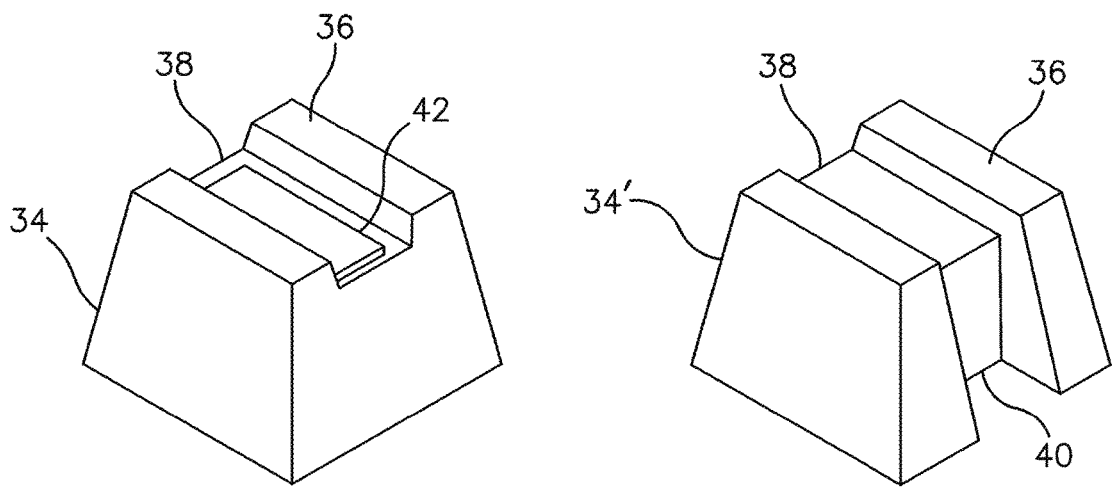
FIG. 5 is a perspective view of a bearing block depicted in accordance with an exemplary embodiment.
FIG. 6 is a perspective view of a bearing block configured for use with vertically offset adjacent modular barrier panels depicted in accordance with an exemplary embodiment.

A variety of bearing blocks 34 may be provided to accommodate a variety of installation conditions. For example, a bearing block 34' which includes a vertical slot 40 disposed along a side surface thereof may be provided, as depicted in FIG. 6. The bearing block 34' may be used when adjacent panels 10 are to be offset vertically, such as when moving up or down a grade. In such an application, the vertical slot 40 may receive a side edge of an adjacent panel 10 while the bottom edge of the overlying panel 10 is received in the trough 38 of the bearing block 34'. Alternatively, the bearing block 34 may be employed when moving up/down a grade by positioning the bearing block 34 inward along the width of the panel 10 a sufficient distance that the bearing block 34 does not interfere with or contact the adjacent panel 10.

A bearing pad 42 may be provided for installation between the bearing block 34 and the overlying panels 10.

The bearing pad 42 preferably comprises a high-density rubber or plastic shim like those known in the art.

Figure 9:
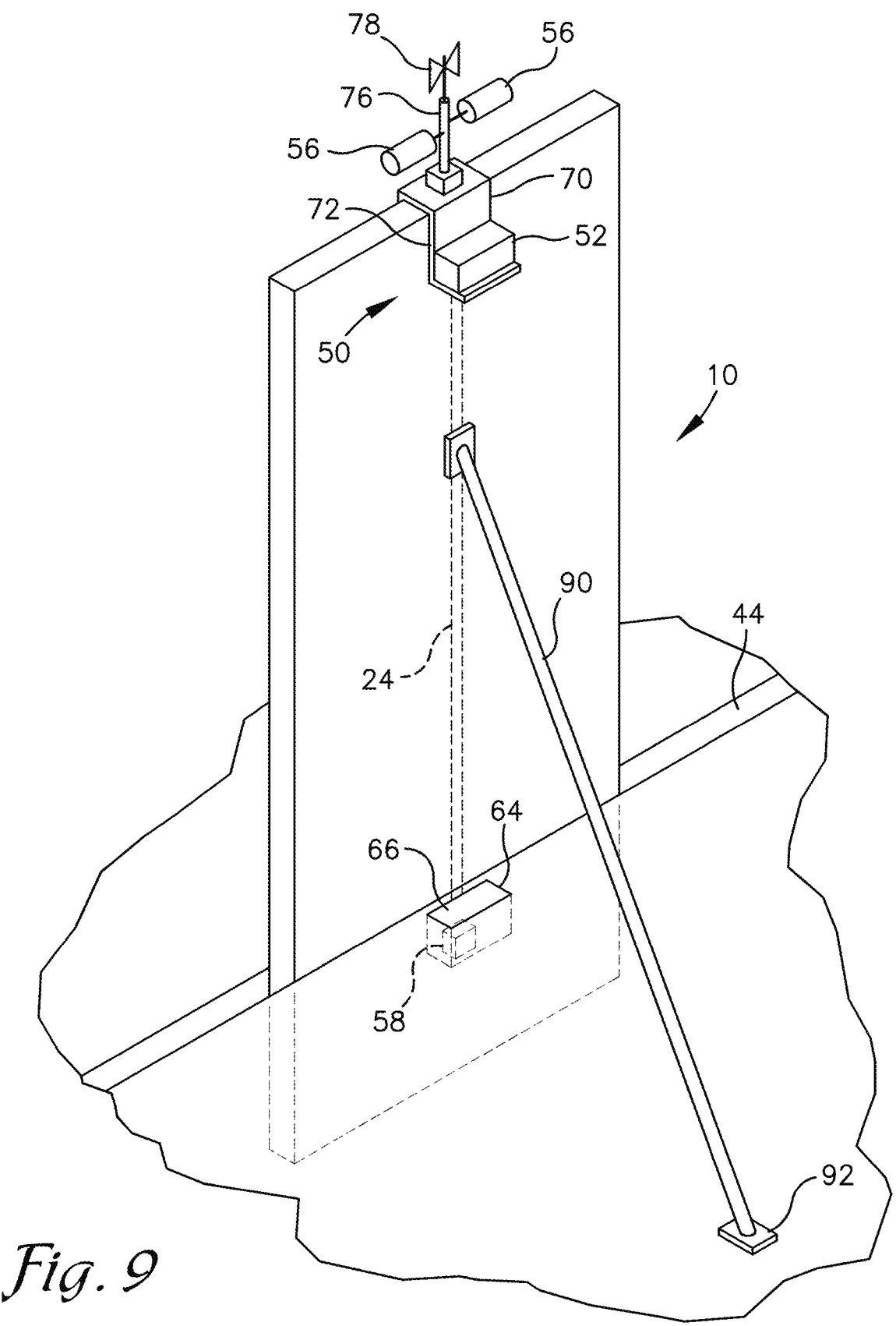
FIG. 9 is perspective view of a modular barrier panel with an electronics package and a temporary support brace disposed thereon in accordance with an exemplary embodiment.
Figure 10:
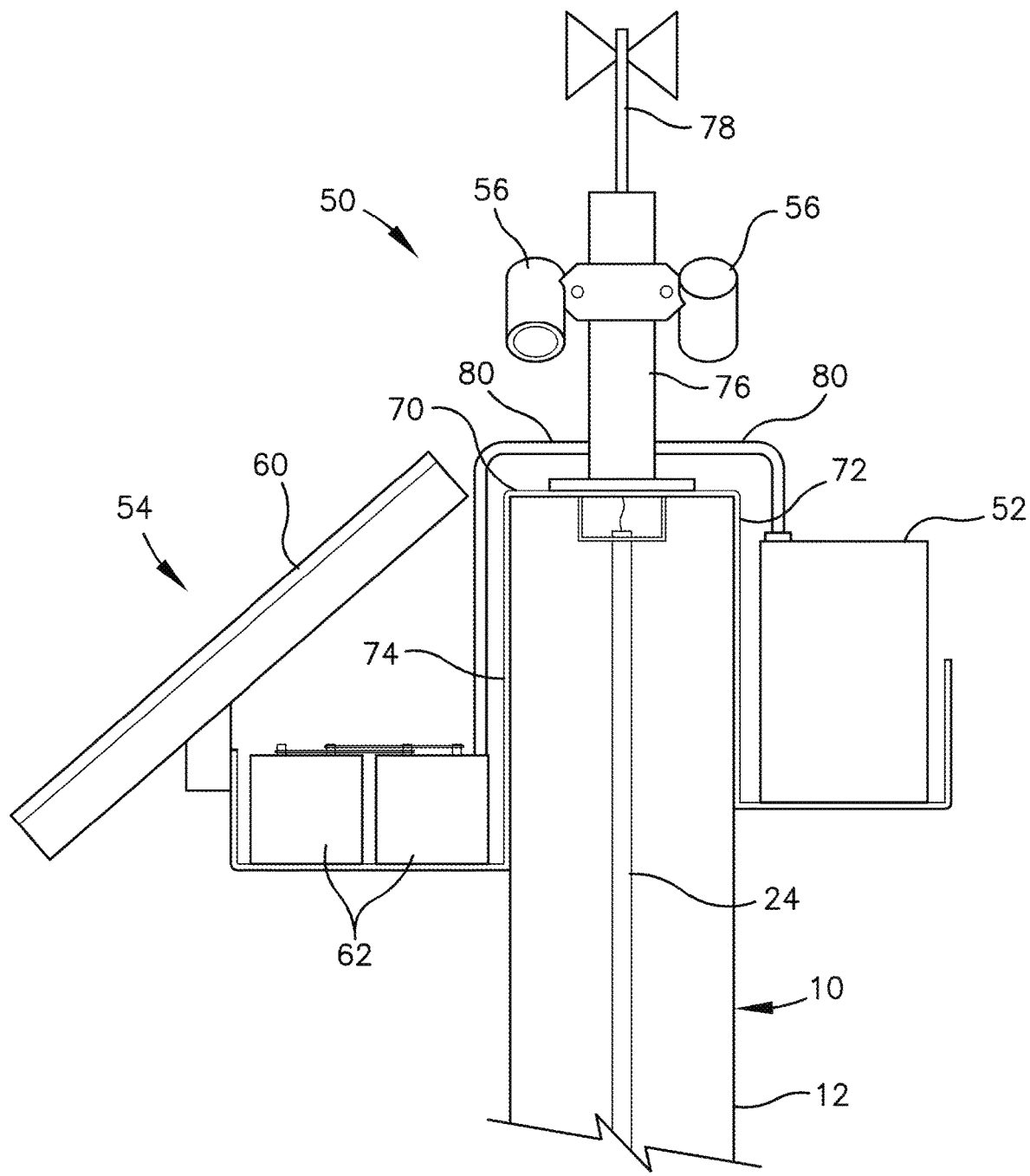
FIG. 10 is a partial cross-sectional view of the modular barrier panel of FIG. 9 depicting a portion of the electronics package mounted on top of the panel in accordance with an exemplary embodiment.

With additional reference now to FIGS. 9 and 10, the panel 10 may include an electronics package 50. The electronics package 50 includes a control unit 52, a power unit 54, and a plurality of sensors including one or more cameras 56 and a vibration sensor 58, among others. The control unit 52 comprises one or more computing devices or logical processing units configured to control and/or oversee operation of the power unit 54 and sensors and to send/receive communications from a main control station. One of skill in the art will recognized that the control unit 52 may take any of a variety of forms and configurations without departing from the scope of exemplary embodiments described herein.

The power unit 54 comprises one or more photovoltaic cell arrays or solar panels 60, one or more batteries 62, and any components necessary for operation of the solar panels 60. Such components may include transformers, cooling units, positioning apparatus for moving and/or maintaining a position of the solar panels 60, and the like. In another embodiment, the power unit 54 may include one or more turbines among other apparatus configured to generate electricity using wind, water, or solar power.

The cameras 56 can comprise one or more visible light or infrared camera units configured to capture video and/or still images. The cameras 56 can be configured to capture images continuously, according to a scheduled sequence, intermittently, as instructed by the control unit 52, and/or in response to a detected condition. For example, the cameras 56 may comprise, include, or be communicably coupled to a motion sensor that, when triggered, causes the cameras 56 to capture one or more images or a video. The motion sensor may be a component of the electronics package 50 generally and the control unit 52 may instruct operation of the cameras 56 based on inputs received from the motion sensor.

The electronics package 50 preferably includes two cameras 56 which can be directed in opposite directions along a barrier formed by the panels 10. However, more or fewer cameras 56 may be employed. For example, a single wide-angle camera 56 that provides a sufficient field of view might be employed. Or one or more short range cameras 56 can be included to provide a view near the camera 56 mounting location and one or more long-range cameras 56 can be included that provide a view of areas a further distance away from the camera 56 mounting location.

The vibration sensor 58 is disposed in, on, or near the base portion 14 of the panel 10. For example, the vibration sensor 58 may be integrated within the panel 10 or can be mounted on the base portion 14 after casting. The vibration sensor 58 can be disposed in the concrete 46 that is poured around the base portion 14 during installation of the panel 10. In one embodiment, the vibration sensor 58 is disposed in a housing 64 coupled to the base portion 14 via the lower junction box 28. The housing 64 is positioned to be encased in the concrete 46 poured around the base portion 14 but with a top wall 66 of the housing 64 exposed and accessible from above the concrete 46. The top wall 66 preferably includes a lockable door or access opening to provide access to the vibration sensor 58 for maintenance or repair as needed. The vibration sensor 58 is electronically coupled to the control unit 52 via the electrical conductor disposed in the conduit 24 to provide signals to the control unit 52 depicting sensed vibrations and to receive power from the power unit 54. In one embodiment, a plurality of vibration sensors 58 are provided. For example, one vibration sensor 58 may be mounted in the housing 64 for sensing vibrations in the panel 10 while one or more additional vibration sensors 58 may be disposed in the concrete 46 poured around the base portion 14 of the panel 10 or in an underlying substrate 68.

The vibration sensor 58 is configured to sense vibrations in the panel 10, the concrete 46 poured around the panel 10, as well as in the underlying substrate 68 around and beneath the panel 10. As such, the vibration sensor 58 can detect tampering with the panel 10, people attempting to climb over the panel 10 or defeat the panel, and people located on the concrete 46 or the nearby substrate 68, as well as underground activities such as attempts to tunnel through the substrate 68 underneath the panel 10.

In another embodiment, a variety of other sensors and sensing devices may be included with the electronics package 50. For example, a radar unit, LIDAR unit, or similar device for sensing ground-based or airborne objects such as airplanes, drone aircraft, or projectile objects can be included. In one embodiment, antiaircraft armaments might be included and deployable to take down unauthorized aircraft. Environmental sensing units for detecting environmental conditions like temperature, air quality, humidity, or the like might also be included among a variety of other sensing units and components.

Communications units configured to provide or extend cellular or radio communications can also be included in the electronics package 50. Such communications units may provide or increase voice and data connectivity for personnel working or traveling along or near the panels 10. The communications units may also aid communication of data between various control units 52 mounted along a long barrier 86 and a control center tasked with oversight of the barrier 86. For example, communication between a distant control unit 52 and the control center might be relayed from one control unit 52 to the next along the barrier 86 when the distant control unit 52 is too far from the control center to communicate directly.

With continued reference to FIGS. 9 and 10, the electronics package 50 is disposed on a mounting saddle 70 configured to be disposed on the top edge of the panel 10. It is understood that one or more components of the electronics package 50 may be otherwise mounted on the panel 10 without departing from the scope of the exemplary embodiments described herein. The mounting saddle 70 is preferably disposed to overlie the upper junction box 26 to enable coupling of the control unit 52 with the electrical conductor disposed in the conduit 24.

The mounting saddle 70 comprises a generally inverted, U-shaped member having a pair of legs 72, 74 extending vertically downward along opposing faces of the panel 10. Each of the legs 72, 74 extends downwardly along the respective face of the panel 10 a respective distance before turning outwardly from the panel 10 for a distance and then turning again to extend upwardly. The legs 72, 74 thus each form a trough in which components of the electronics package 50 can be mounted. As depicted in FIG. 10, the control unit 52 is mounted in the trough of the leg 72 while the power unit 54, including the solar panel 60 and batteries 62 are mounted on the leg 74.

A mast 76 is coupled to the mounting saddle 70 along the apex of the inverted U-shape and extends vertically upward from the top edge of the panel 10. The cameras 56 are mounted to the mast 76 and an antenna 78 is disposed on a distal end thereof. Each of the components of the electronics package 50 are electrically and communicatively coupled to the control unit 52 via one or more electrical conductors which may be disposed in one or more conduits 80.

With additional reference to FIGS. 11-17, construction of a barrier 86 formed from a plurality of the panels 10 is described in accordance with an exemplary embodiment. The construction is described below with respect to a mobile construction configuration that can be moved as a construction location moves along the barrier 86. Such description is not intended to limit embodiments of the invention; it is understood that the panels 10 may be constructed at a single location and shipped to the construction location as needed. The panel 10 is configured to be cast from a concrete that is poured into a mold (not shown). The concrete preferably comprises a fiber reinforced, high-strength concrete or similar material, but other materials may be employed.

The molds may be constructed from a thermoformed plastic, resin, or similar material and may include a support structure constructed from a plurality of structural members, such as extruded aluminum beams, channels, tubes, or the like. A plurality of molds are constructed and disposed on one or more flat-bed trucks, trailers, or the like. The molds are thus easily moveable from one location to the next to enable the panel 10 construction location to remain near a location in which the panels 10 are to be installed in the barrier 86. The flat-bed trucks/trailers on which the molds are disposed may include outriggers or other leveling means configured to place the molds in a level position for casting of the panels 10.

The molds are driven to a location near the installation location for the panels 10 to be cast and prepared for casting. Preparation for casting may include leveling of the molds, application of release agents, and cleaning of the molds, among other processes. If the panel 10 to be cast is to be a non-standard size or form, dividers may be placed into the mold cavity to block the flow of concrete as desired. Additionally, reinforcement members 22, 22', 23, the conduit 24, and/or the upper and lower junction boxes 26, 28 may be positioned within the mold cavity. The concrete is prepared and poured into the molds. Vibration means, such as heavy-duty electric vibrators may be employed to insure proper filling of the mold cavity, and elimination of voids in the concrete, among other characteristics. Insulating blankets may be disposed over the molds to aid curing which is preferably substantially completed overnight to allow removal of the cured panel 10 from the mold and reuse of the mold each day. The curing of the concrete is preferably completed without use of external heating means, such as steam or radiant heating elements.

After sufficient curing, the panels 10 are removed from the molds and moved directly to their installation location or disposed in a holding location until needed. The vibration means may also be employed to aid removal of the panels 10 from the molds. The molds can then be prepared for subsequent castings, e.g. cleaned and moved to a next location.

The panels 10 are configured for installation in a trench 44. The trench 44 may be formed by any desired means including for example a specialized trencher that is configured to form the trench 44 at a predetermined depth and width. In one embodiment, the trench 44 is about 3.0 feet (about 1.0 meter) wide and about 8.5 feet (about 2.6 meters) deep, however other dimensions may be employed based on design characteristics of a particular application.

Figure 12:
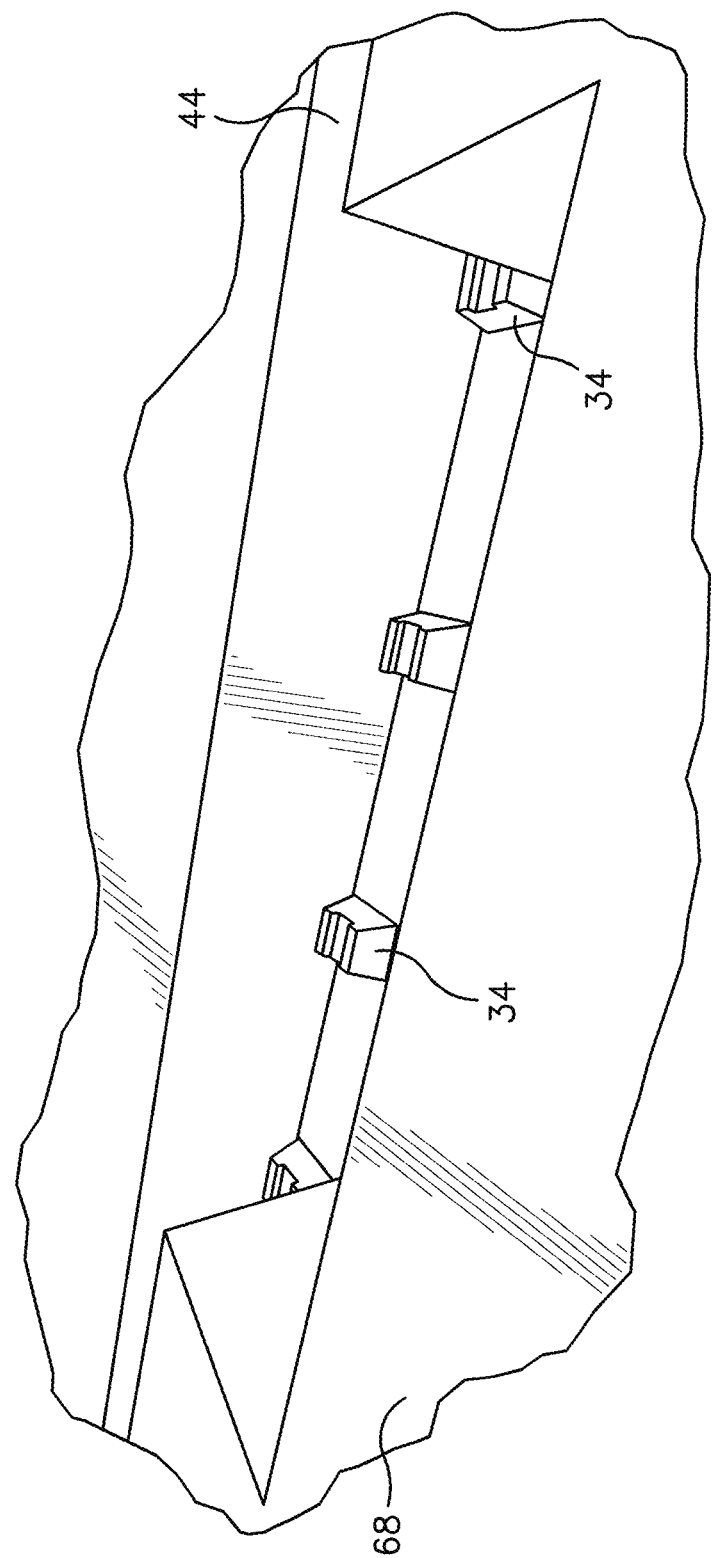
FIG. 12 is an illustrative perspective view of a barrier construction site depicting a trench with a plurality of bearing blocks disposed therein in accordance with an exemplary embodiment and with an portion of a substrate along one side of the trench removed for viewing within the trench.

Bearing blocks 34 are positioned in the trench 44 at spaced apart locations to be aligned with the joints between adjacent panels 10, as depicted in FIG. 12. The bearing blocks 34 may be cast on-site in a manner similar to that of the panels 10 and from similar or dissimilar materials. In one embodiment, the bearing blocks 34 are cast from a concrete that employs aggregate and/or other materials obtained from digging the trench 44. Bearing pads 42 may be disposed in the troughs 38 in the top surfaces 36 of the bearing blocks 34. The bearing blocks 34 are aligned and leveled as needed to ensure a level support base for the panels 10. When the trench 44 moves up or down a grade specialized bearing blocks, such as the bearing blocks 34' may be employed.

Figure 13:
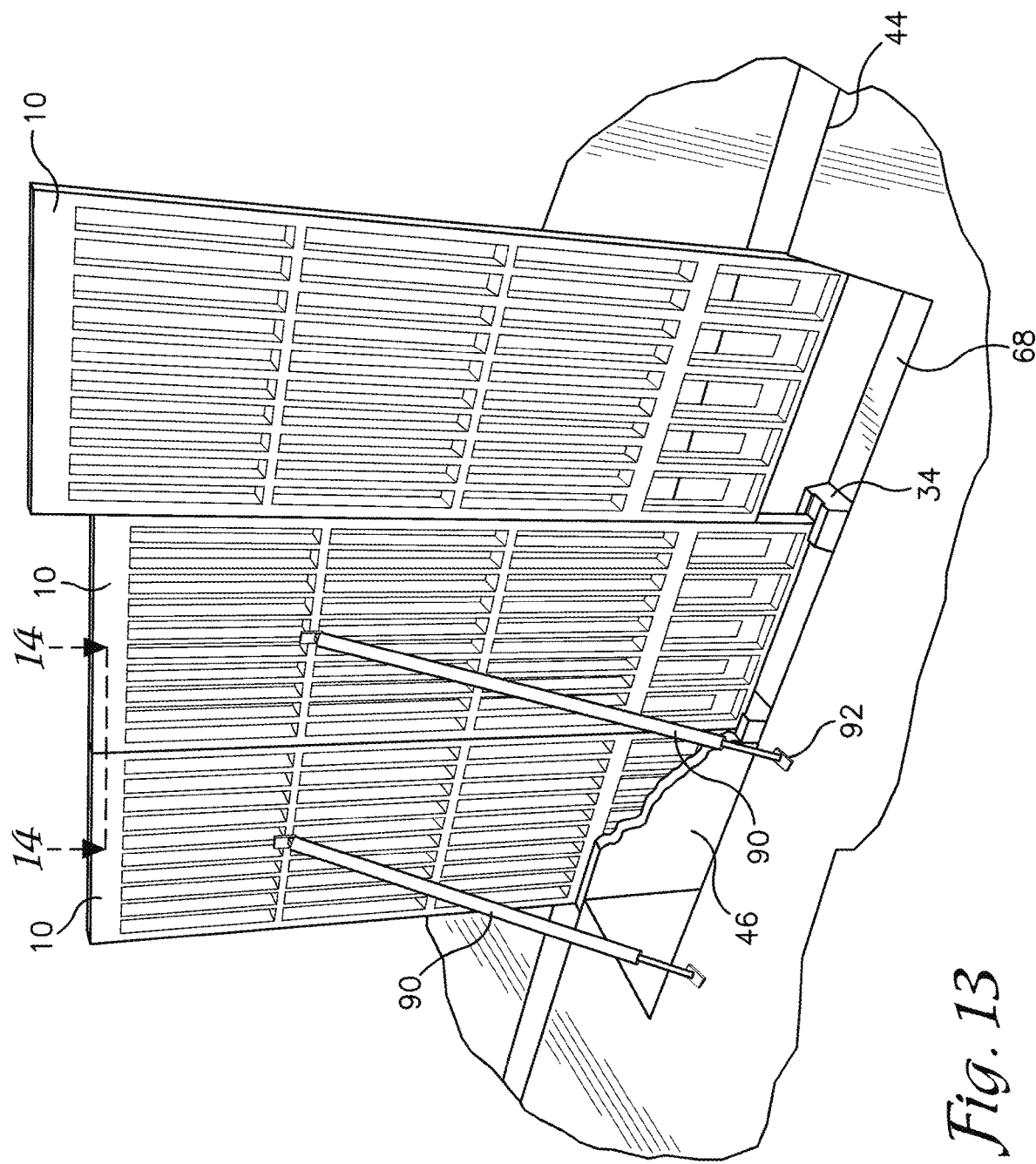
FIG. 13 is perspective view of the barrier construction site of FIG. 12 depicting a plurality of modular barrier panels disposed on the bearing blocks and a concrete material being poured into the trench in accordance with an exemplary embodiment.

A first panel 10 is disposed on top of two adjacent bearing blocks 34 with the bottom edge of the panel 10 being positioned within the trough 38 in the bearing blocks 34, as depicted in FIG. 13. The troughs 38 in the bearing blocks 34 aid to ensure proper alignment of the panels 10. The first panel 10 is leveled and oriented vertically and a support brace 90 is installed to retain the panel 10 in position. The support brace 90 may be extendable or otherwise adjustable to ensure proper vertical alignment of the panel 10. An opposite end of the support brace 90 may be anchored to a deadman anchor 92 to secure it in position.

Figure 15:
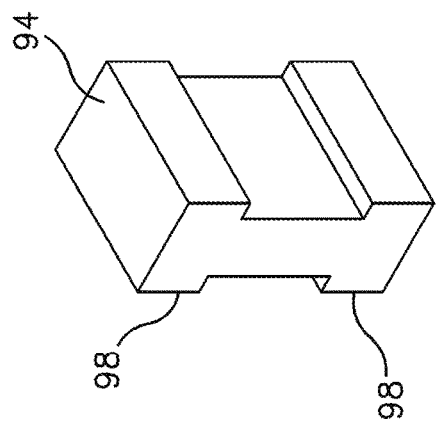
FIG. 15 is a perspective view of the coupling slug of FIG. 14.

A next panel 10 is disposed alongside and abutting the first panel 10 along lateral edges thereof and with their adjacent bottom corners sharing an underlying bearing block 34. The next panel 10 is leveled and a support brace 90 installed. As depicted in FIGS. 14-15, a coupling slug 94 may be employed to couple adjacent panels 10 together. Vertically oriented, C-shaped channels 96 may be molded into or coupled along at least a portion of the lateral edge of each panel 10. Preferably, the channels 96 extend downwardly from a top edge of the panel 10 along the lateral edge and are open at the top edge to allow insertion of the slug 94. The channels 96 extend between about 6 inches (15 cm) and about 24 inches (61 cm), but may extend any desired distance along the side edges. The slug 94 comprises a bar having an I-shaped cross-section with dimensions configured to closely cooperate with those of the channels 96 to enable opposing ends or flanges 98 of the slug 94 to be received within respective ones of the channels 96 in a close-fitting relationship. Interaction between the C-shape of the channels 96 and the flanges 98 of the slug 94 resists movement of the two joined panels 10 relative to one another.

In another embodiment, a coupling tab (not shown) may be installed on the top edges of the two panels 10 and extending across the joint therebetween. The tab is attached to each of the panels 10 using one or more bolts or other fastening means. When the adjacent panels 10 are level with one another, the tab may comprise an elongate planar member. When the adjacent panels 10 are vertically offset from one another, such as when moving up or down a grade, the tab may comprise an L-shaped bracket that couples to a top edge of one panel 10 and to a lateral edge of the adjacent panel 10. Installation of the panels on the bearing blocks 34 in the trench 44 continues until a desired length of the barrier 86 is formed.

The housing 64 for the vibration sensors 58 may be installed on the desired panels 10 and the vibration sensors 58 installed therein. Preferably only select ones of the panels 10 include the electronics package 50 and/or the conduit 24 and junction boxes 26, 28 installed thereon. In some applications, the panels 10 with the electronics package 50 are spaced apart at a desired interval along the length of the barrier 86. The interval may be about every half mile (0.8 kilometers) or any other interval needed based on a range of the cameras 56 and vibration sensors 58, as well as a particular application, terrain, environment, or purpose. The panels 10 with and without the electronics package may be identical but for the absence of the electronics package 50 and/or the conduit 24 and junction boxes 26, 28.

In one embodiment, a conductor is installed along the base portions 14 of the adjacent panels 10 extending along the length of the trench 44 to enable installation of a plurality of vibration sensors 58 on one or more of the panels 10, in the trench 44 or into the underlying substrate 68; those vibration sensors are electronically and communicatively coupled to an electronics package 50 via the conductor. Those vibrations sensors may be disposed in a housing similar to the housing 64 or may be configured to be encased in the concrete 46.

Figure 17:
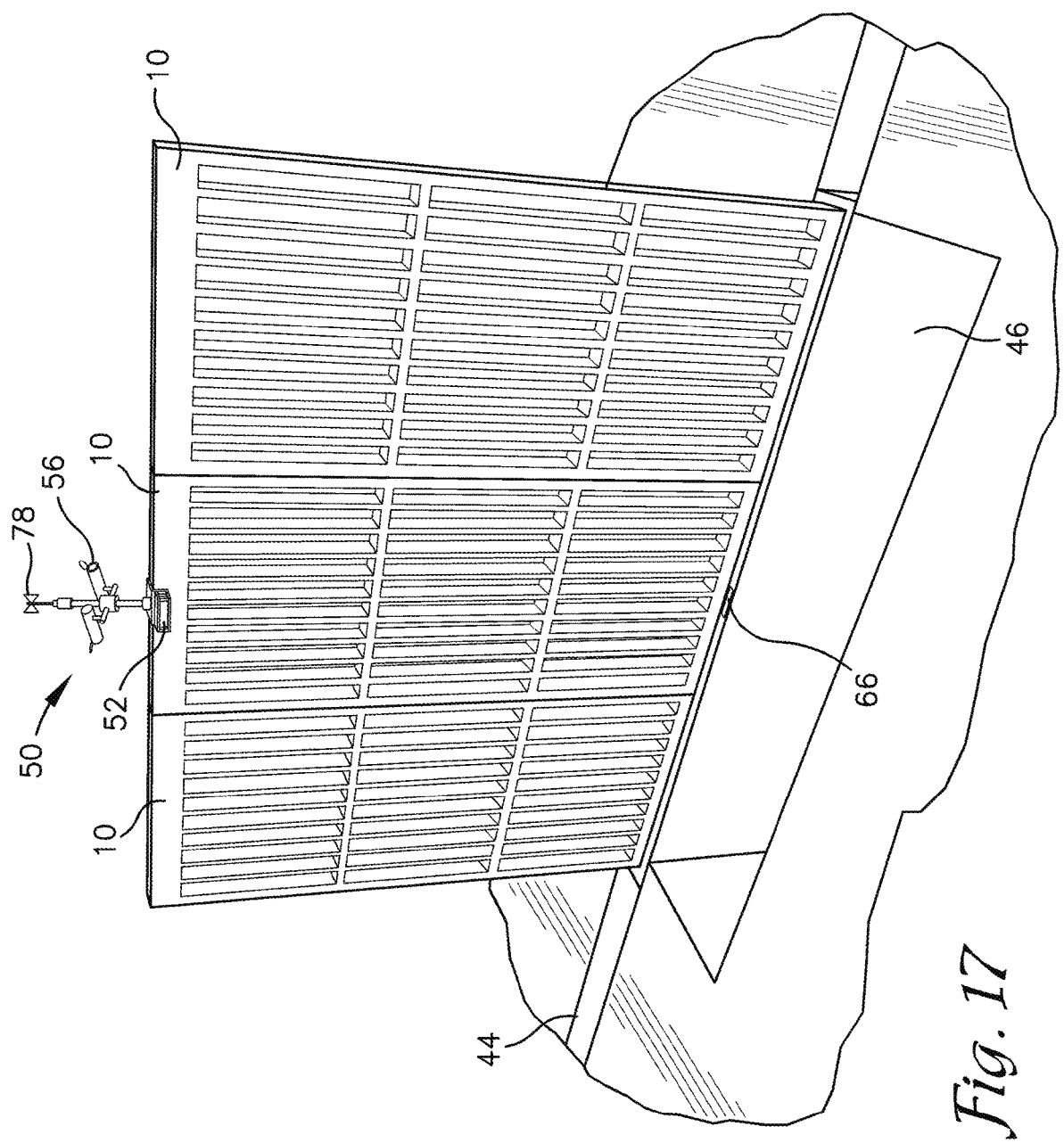
FIG. 17 is a perspective view of the barrier construction site of FIG. 12 depicting a completed section of the barrier in accordance with an exemplary embodiment.

One or more temporary barriers (not shown) or expansion gap components may be installed along the length of the trench 44 and transverse to the length of the trench 44 using common techniques and materials. Concrete 46 is poured into the trench 44 around the base portions 14 of the adjacent panels 10 and filled up to a desired level, as depicted in FIGS. 13 and 17. The concrete 46 can be poured into the trench 44 on one side of the barrier 86 with spacing beneath the panels 10 provided by the bearing blocks 34 allowing the concrete 46 to flow beneath the panels 10 and to fill both sides of the trench 44. Additionally, the openings 32 in the base portion 14 allow the concrete to flow through the panels 10 and fill both sides of the trench 44. The waffle-like shape provided by the depressions 30 and/or the openings 32 provide a strong engagement and interlocking between the concrete 46 and the base portions 14 of the panels 10 and distributes forces and load transfer from the panels 10 into the concrete 46 foundation.

Figure 16:
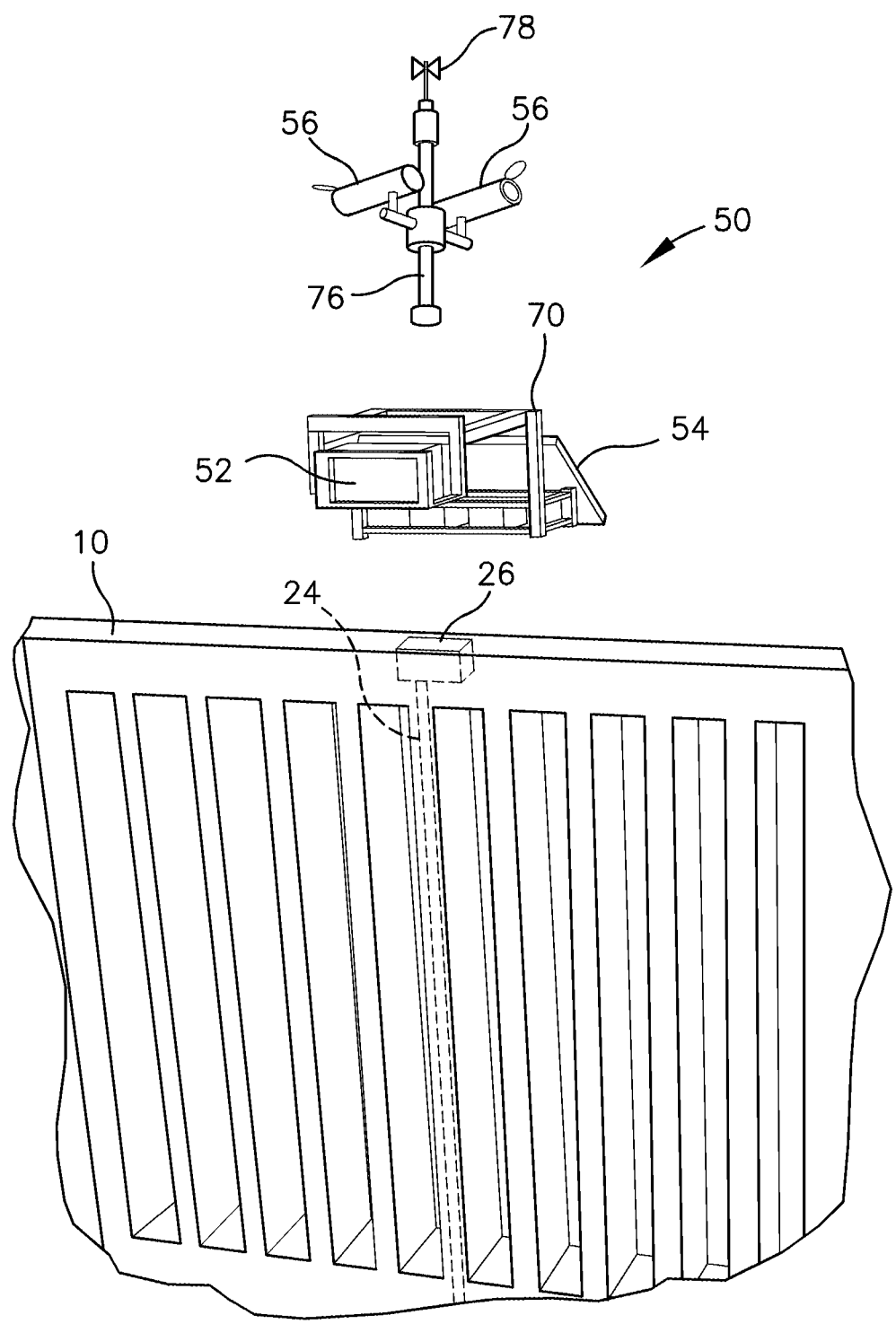
FIG. 16 is a partial perspective view of the barrier construction site of FIG. 12 depicting an electronics package being disposed on a top edge of a modular barrier panel in accordance with an exemplary embodiment.

Following sufficient curing of the concrete 46, the support braces 90 and deadman anchors 92 can be removed. The electronics package 50, including the mounting saddle 70 can be installed on the selected ones of the panels 10, as depicted in FIGS. 16-17, and operation thereof commenced.

During operation of the barrier 86, the vibration sensors 58, the cameras 56, and/or any other sensing units included in the electronics package 50 may detect movements on, near, under, or over the barrier 86. The electronics package 50 may remain in a low power state until such movement or activity is detected. Upon detection, the cameras 56 may begin capturing images/video which may be stored by the control unit 52 in an onboard memory or transmitted to a central control station for viewing and/or storage. The control unit 52 may also provide a signal to a central control station to alert personnel of the activity. The personnel may access the cameras 56 to view the activity in real-time or near real-time and determine whether further action need be taken. In one embodiment, the control unit 52 may sound an audible and/or visual alert via an alert system contained in the electronics package 50 to alert trespassers that they have been detected and/or that they should cease and desist among other alert actions.

Provision of the vibration sensors 58 (and the electronics packages 50 generally) along the length of the barrier 86 also enables personnel to determine a location along the barrier 86 at which the activity is occurring, thereby narrowing the area that must be viewed. Additionally, provision of the expansion gaps within the concrete 46 may aid to limit an area in which the vibration sensors 58 can detect movements, thus further increasing the precision in associating a detected movement with a location along the barrier 86.

The configuration of the panels 10 and the tasks required to construct the barrier 86 enables the construction to take place substantially from one side of the barrier 86 and with minimal land requirements and disruption. The trench 44 is relatively narrow. Thus issues associated with obtaining rights to land or right-of-ways is reduced, and disruption of the environment is minimized. Following formation of the trench 44, construction of the panels 10 and installation of the panels 10 in the trench 44 can be substantially or completely performed on one side of the trench 44. For example, the panels 10 can be cast and installed along with the support braces 90 from one side of the trench 44. And the concrete 46 can be poured and the electronics packages 50 installed from the same side of the trench 44. Such a configuration increases the safety of workers, for example when installing the panels 10 in a hostile environment, e.g. the workers may remain substantially behind the panels 10 and out of line-of-sight from would-be attackers on the opposite side of the barrier 86. The configuration may also substantially eliminate the need for workers to cross boundaries into territories that they may not be authorized to occupy.

The configuration of the panels 10 also provides a variety of beneficial features. The incorporation of the vents 20 reduces the amount of concrete needed and thus the costs for production of the panels 10. The weight of the panels 10 is also decreased which eases handling, installation, and reduces the support requirements of the foundation concrete 46. The vents 20 also provide a more aesthetically pleasing appearance over solid walls, allow passage of sunlight, wind, rain, snow, small animals, insects, and airborne particles such as seeds, dust, sand, and the like through the barrier 86. Similarly, the vents 20 enable viewing through the barrier 86 by personnel stationed on either side thereof.

The stresses applied on the panels 10 by wind is reduced by allowing the wind to at least partially pass through the vents 20, thus further reducing the forces applied to the foundation concrete 46 and reducing the amount of reinforcement needed in the panels 10, e.g. reducing the requirements on the reinforcement members 22. Additionally, allowing winds to at least partially pass through the panels 10 reduces the accumulation of dust, sand, and other debris along the barrier 86 which reduces the need for maintenance to remove such debris.

A variety of additional configurations of the panels 10 are depicted in FIGS. 18 and 20-22 and referred to as panels 110, 210, and 310. FIGS. 18 and 18a depict a panel 110 that includes a uniform configuration throughout both the aboveground and base portions 12, 14. The configuration includes four rows of open vents 20, the lowermost row forming the base portion 14 which is configured to extend at least partially above grade when installed. As such, open vents 20 are provided at the ground level for passage of animals, water, and the like.

Figures 19, 20, 20A:
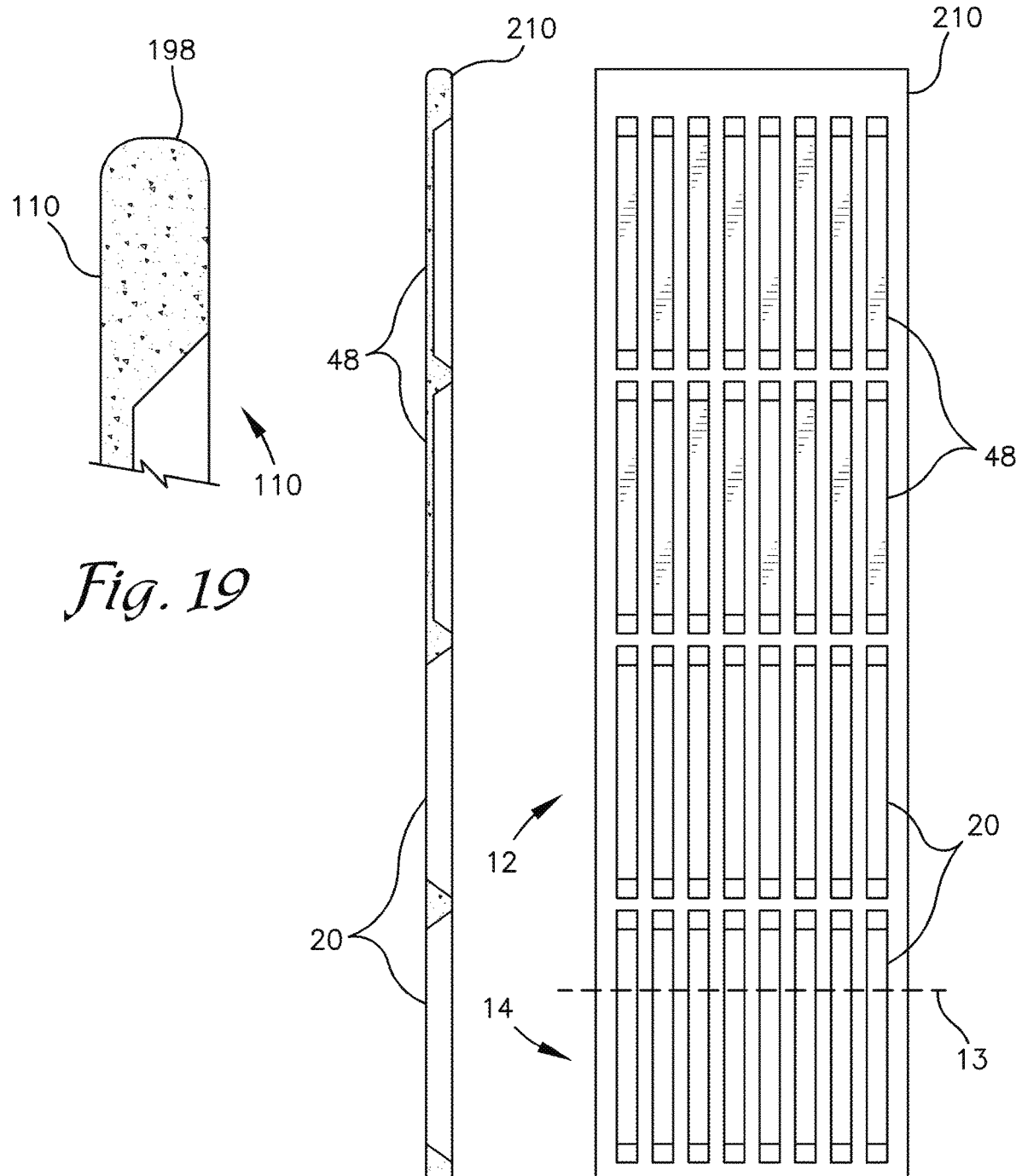
FIG. 19 is an enlarged partial cross-sectional side-elevational view of a top edge of the panel of FIG. 18.
FIG. 20 is a front elevational view of a panel having rows of closed vents depicted in accordance with another exemplary embodiment.
FIG. 20a is a cross-sectional side elevational view of the panel of FIG. 20.

The panel 110 also includes a rounded top edge 198, as depicted in FIG. 19, which may make it more difficult for barrier scaling devices like grappling hooks or the like to engage the top edge for aiding people attempting to scale or climb the panel 110. The top edge 198 may also be fitted with other anti-scaling devices such as razor-wire, spikes, or the like as desired.

A panel 210, depicted in FIGS. 20 and 20a, is configured similarly to that of the panel 110 but with closed vents 48 forming the top two rows of vents. The closed vents 48 may increase the difficulty encountered by persons attempting to scale or climb over the panel 210 by eliminating locations at which to obtain a handhold or to engage another support means such as a rope.

Figures 21, 21A:
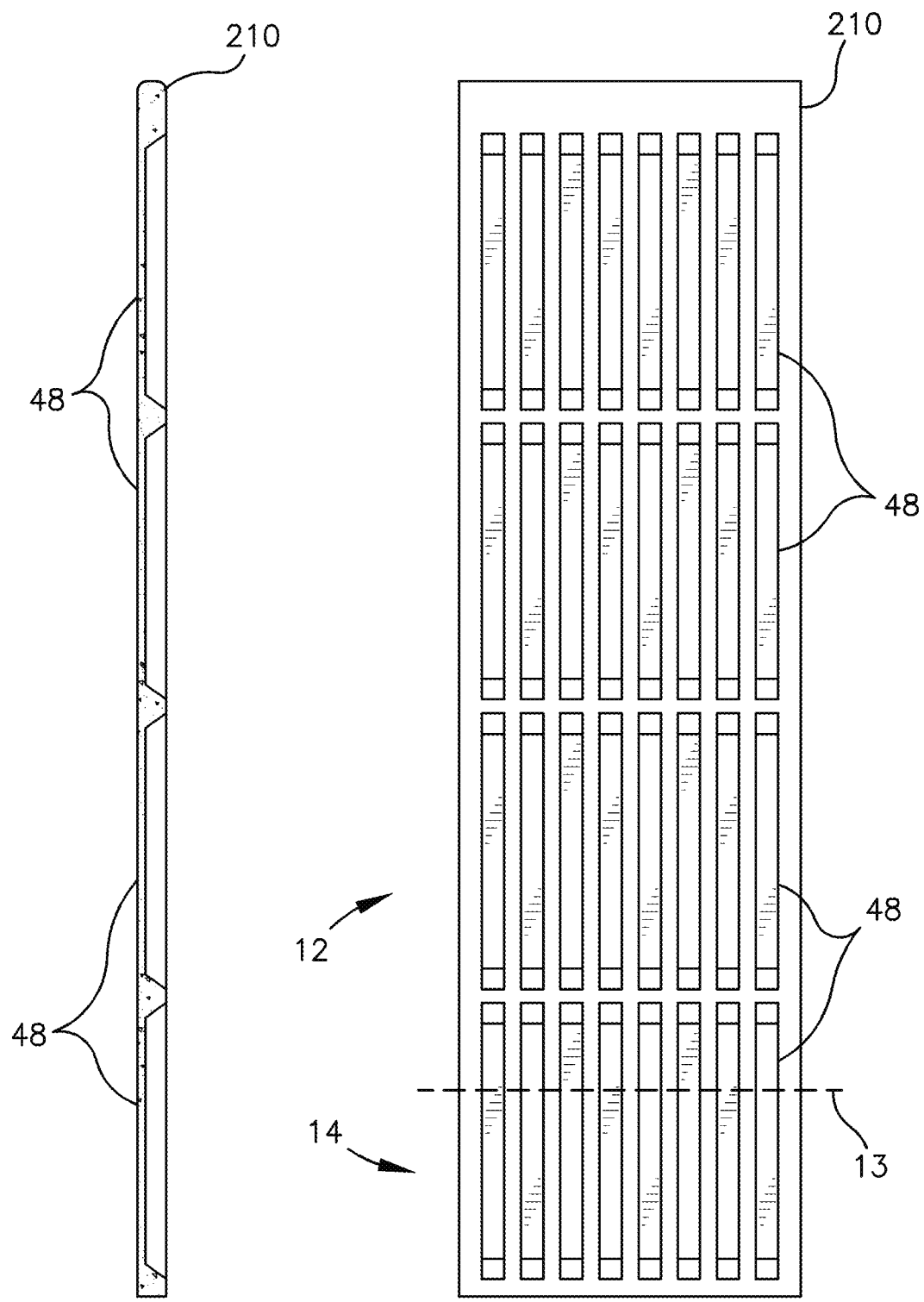
FIG. 21 is a front elevational view of a panel having all closed vents depicted in accordance with another exemplary embodiment.
FIG. 21a is a cross-sectional side elevational view of the panel of FIG. 21.
Figures 22, 22A:
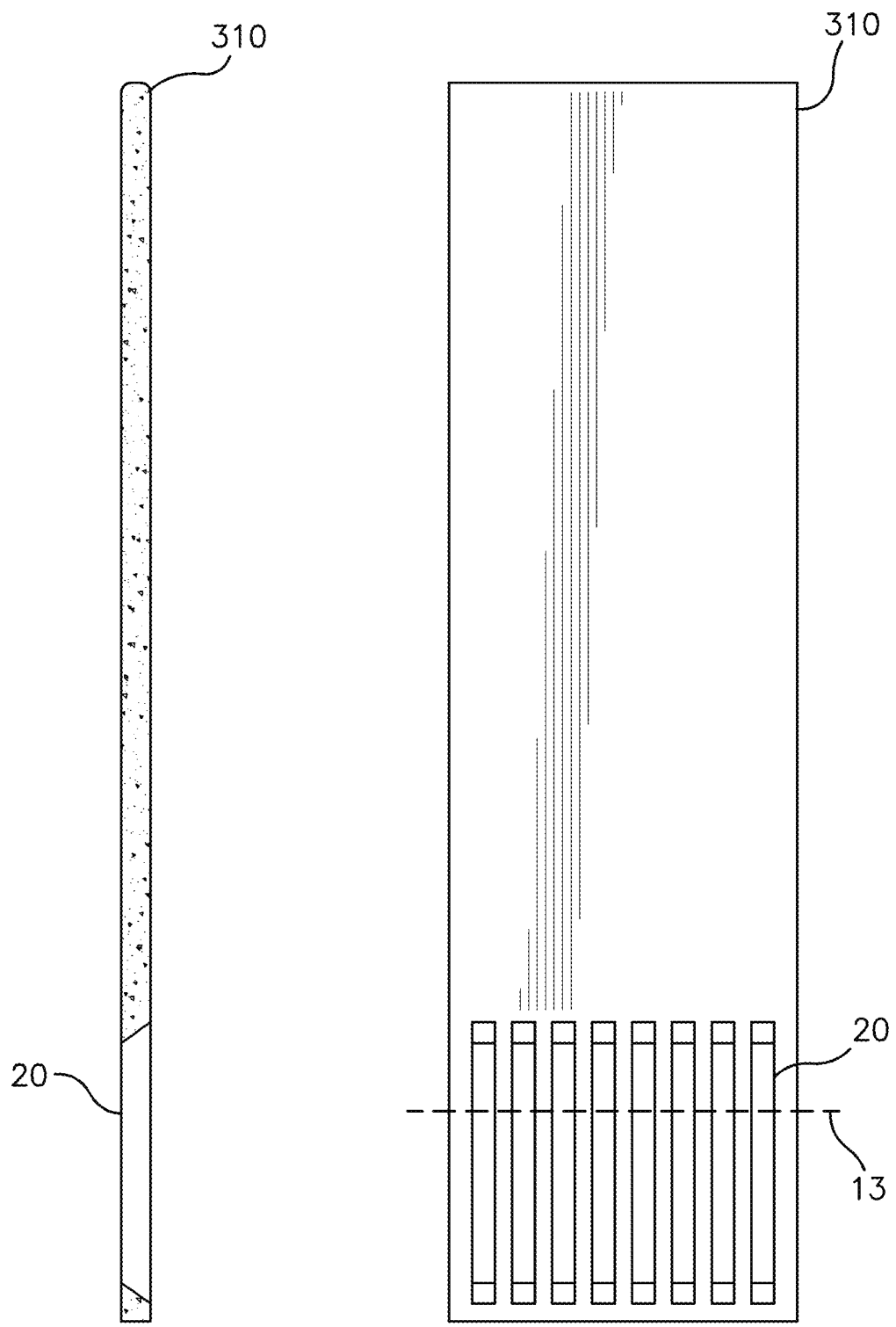
FIG. 22 is a front elevational view of a panel having a base portion with open vents and an aboveground portion without vents depicted in accordance with an exemplary embodiment.
FIG. 22a is a cross-sectional side elevational view of the panel of FIG. 22.

FIGS. 21 and 21a depict a panel 310 that is also configured like the panel 110 but with all closed vents 48 and no open vents 20. FIGS. 22 and 22a depict another panel 410 that includes a base portion 14 configured like that of the panel 110 with open vents 20, but with an aboveground portion 12 that comprises a planar slab with no closed or open vents formed therein. The panel 410 may include the vertical and/or transverse reinforcement members 22, 22', 23.

Although particular configurations of the panels 10, 110, 210, 310 and 410 are described herein, it is understood that portions of each of the described configurations may be interchangeable. For example, the panel 110 may be configured with one row of the open vents 20 replaced with a section of no vents like that of the panel 410.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A method for erecting a barrier with all construction activities occurring on a single side of the barrier, the method comprising:
   providing a plurality of modular barrier panels on a first side of a trench formed in the ground, each panel having a generally planar form and including a base portion and an aboveground portion, the aboveground portion including a plurality of vertical members and a plurality of transverse members arranged in a grid-like pattern;
   installing, from the first side of the trench, a pair of bearing blocks in the trench, each of the bearing blocks including a trough in a top surface thereof that is dimensioned to receive a bottom edge of the panels;
   disposing a first panel of the plurality of panels on the pair of bearing blocks from the first side of the trench, a bottom edge of the first panel being disposed in the trough on the bearing blocks;
   pouring a concrete into the trench from the first side of the trench, the concrete flowing at least partially beneath the first panel and a bottom surface of the trench to fill a space between the base portion of the first panel and a second side of the trench and a space between the first panel and the first side of the trench; and
   installing an electronics package on a top edge of the first panel, the electronics package including at least a control unit and a camera, wherein the electronics package is disposed on a mounting saddle, the mounting saddle including an inverted U-shaped form including a first leg disposed on a first side of the first panel and a second leg disposed along an opposite second side of the first panel and an apex portion disposed on the top edge of the first panel, the control unit being coupled to one of the first or second legs, and the camera being coupled to a mast disposed on the apex portion.

2. The method of claim 1, further comprising:
   installing a vibration sensor along the base portion on the first side of the trench, the vibration sensor being configured to detect vibrations in the first panel, in the concrete poured in the trench, and in a surrounding substrate.

3. The method of claim 1, wherein the first panel includes a first junction box disposed at a top edge of the aboveground portion, a second junction box disposed on the base portion, and a conduit cast within one of the vertical members to extend between the first and second junction boxes.

4. The method of claim 3, further comprising:
   installing a vibration sensor along the base portion of the first panel on the first side of the trench, the vibration sensor being configured to detect vibrations in the first panel, in the concrete poured in the trench, and in a surrounding substrate, and wherein the vibration sensor is accessible via the second junction box and is communicatively coupled to a control unit disposed near the first junction box via a conductor disposed in the conduit.

5. The method of claim 1, wherein the first panel comprises an electronics panel, and wherein the plurality of panels includes a plurality of electronics panels and a plurality of standard panels that do not include the electronics package, the method further comprising:
   installing the plurality of panels in the trench with the electronics panels being spaced apart by a predetermined number of the standard panels disposed therebetween, the plurality of panels forming a barrier; and
   monitoring an area around the plurality of electronics panels and the plurality of standard panels via the electronics packages on each of the electronics panels.

6. The method of claim 5, wherein the electronics packages on each of the electronics panels are communicatively coupled with a disparately located control center.

7. The method of claim 6, further comprising:
   communicating wirelessly with each of the electronics packages on the electronics panels.

8. The method of claim 5, further comprising:
   detecting by the electronics package on a particular one of the electronics panels, activity around the barrier; and
   determining a location of the activity along the barrier based at least in part on a known location of the particular one of the electronics panels.

9. The method of claim 5, further comprising:
   detecting by the electronics package on a particular one of the electronics panels, activity around the barrier; and
   producing by the electronics package on the particular one of the electronics panels, an alert that is perceptible by humans located near the particular one of the electronics panels.

10. The method of claim 1, wherein providing the plurality of modular barrier panels further comprises:
    casting the panels on the first side of the trench and in close proximity to the trench.

11. The method of claim 10, wherein casting the panels includes disposing a vertical reinforcement member within a vertical member of each of the panels.

12. The method of claim 11, wherein the vertical reinforcement member comprises a railroad track rail.

13. The method of claim 1, wherein the base portion of the first panel extends at least partially vertically upward beyond a top of the trench and a top surface of the concrete poured in the trench, and wherein the base portion includes a plurality of depressions disposed side-by-side along the width of the base portion and each of the depressions forms an opening that extends vertically upward beyond the top of the trench and the concrete.

14. The method of claim 1, further comprising:
disposing a third bearing block in the trench; and
disposing a second panel at least partially on one of the bearing blocks in the pair of bearing blocks and on the third bearing block, the second panel having a lateral edge abutting a lateral edge of the first panel.

15. The method of claim 14, further comprising:
installing a coupling slug into a first channel in the first panel and a second channel in the second panel, the first channel extending from a top edge of the first panel along the lateral edge, the second channel extending from a top edge of the second panel along the lateral edge and in opposition to the first channel, the coupling slug and the first and second channels being configured to resist transverse movement of the coupling slug out of engagement with the first and second channels.

16. The method of claim 1, further comprising:
disposing a bearing pad in the trough of each bearing block.

17. A method for erecting a barrier with all construction activities occurring on a single side of the barrier, the method comprising:
providing a plurality of modular barrier panels on a first side of a trench formed in the ground, each panel having a generally planar form and including a base portion and an aboveground portion, the base portion including a plurality of depressions disposed side-by-side, and the aboveground portion including a plurality of vertical members and a plurality of transverse members arranged in a grid-like pattern;
installing, from the first side of the trench, a pair of bearing blocks in the trench, each of the bearing blocks including a trough in a top surface thereof that is dimensioned to receive a bottom edge of the panels;
disposing a first panel of the plurality of panels on the pair of bearing blocks from the first side of the trench, a bottom edge of the first panel being disposed in the trough on the bearing blocks;
pouring a concrete into the trench from the first side of the trench, the concrete flowing at least partially beneath the first panel and a bottom surface of the trench to fill a space between the base portion of the first panel and a second side of the trench and a space between the first panel and the first side of the trench;
installing an electronics package on a top edge of the first panel to form an electronics panel the electronics package including at least a control unit and a sensor, the plurality of panels including a plurality of electronics panels and a plurality of standard panels that do not include the electronics package;
installing a remainder of the plurality of panels in the trench with the electronics panels being spaced apart by a predetermined number of the standard panels disposed therebetween, the plurality of panels forming a barrier; and
monitoring an area around the plurality of electronics panels and the plurality of standard panels via the sensors of the electronics packages on each of the electronics panels.

18. The method of claim 17, further comprising:
casting the plurality of panels on the first side of the trench and in close proximity to the trench.

\* \* \* \* \*